(12) United States Patent
Adams

(10) Patent No.: US 8,863,915 B2
(45) Date of Patent: Oct. 21, 2014

(54) DISC BRAKE PAD CUSHIONS

(76) Inventor: Philip Herbert Adams, Tallahassee, FL (US)

( * ) Notice: Subject to any disclaimer, the term of this patent is extended or adjusted under 35 U.S.C. 154(b) by 1518 days.

(21) Appl. No.: 11/895,585

(22) Filed: Aug. 25, 2007

(65) Prior Publication Data

US 2007/0295567 A1 Dec. 27, 2007

Related U.S. Application Data

(63) Continuation-in-part of application No. 11/166,569, filed on Jun. 25, 2005, now abandoned.

(51) Int. Cl.
*F16D 65/38* (2006.01)

(52) U.S. Cl.
USPC .................................. 188/73.37; 188/264 G

(58) Field of Classification Search
USPC .......... 188/73.35, 73.36, 73.37, 73.38, 264 G
See application file for complete search history.

(56) References Cited

U.S. PATENT DOCUMENTS

| | | | |
|---|---|---|---|
| 3,353,641 A | 11/1967 | Chana | |
| 3,378,116 A * | 4/1968 | Hennig | 188/250 B |
| 3,563,347 A | 2/1971 | Hahm | |
| 3,693,765 A | 9/1972 | Hikida et al. | |
| 3,885,651 A * | 5/1975 | Odier | 188/73.37 |
| 3,918,555 A * | 11/1975 | Rath | 188/73.37 |
| 3,980,160 A | 9/1976 | Hoffman et al. | |
| 4,093,045 A | 6/1978 | Kawamura | |
| 4,225,021 A | 9/1980 | Kawamura | |
| 4,235,314 A | 11/1980 | Reagan | |
| 4,240,530 A | 12/1980 | Tillenburg | |
| 4,373,615 A | 2/1983 | Melinat | |
| 4,660,685 A | 4/1987 | Thacker et al. | |
| 4,722,424 A | 2/1988 | Ikeuchi | |
| 5,014,827 A | 5/1991 | Wang et al. | |
| 5,035,305 A | 7/1991 | Lammers | |
| 5,099,962 A | 3/1992 | Furusu et al. | |
| 5,161,652 A | 11/1992 | Suzuki | |
| 5,265,942 A | 11/1993 | Jones | |
| 5,330,034 A | 7/1994 | Rancourt et al. | |
| 5,407,034 A | 4/1995 | Vydra et al. | |
| 5,413,194 A | 5/1995 | Kulis, Jr. et al. | |
| 5,480,008 A | 1/1996 | Hummel et al. | |
| 5,492,202 A * | 2/1996 | Drotar et al. | 188/73.35 |
| 5,515,950 A | 5/1996 | Kwolek | |

(Continued)

FOREIGN PATENT DOCUMENTS

| | | | | |
|---|---|---|---|---|
| EP | 0191597 A1 * | 8/1986 | | F16D 65/02 |
| JP | 62127531 A * | 6/1987 | | 188/72.4 |

OTHER PUBLICATIONS

Lectures on Viscoelasticity Theory by A. C. Dipkin, Springer-Verlag, New York, 1972, pp. 16-19.

(Continued)

*Primary Examiner* — Xuan Lan Nguyen

(57) ABSTRACT

Cushions for disc brake pads are disposed between the brake pads and their caliper pistons or caliper fingers. The cushions possess such characteristics of resilience that, during braking action, brake pads follow irregularities and ride over high spots on rotor faces. This action significantly reduces uneven frictional drag, which lowers braking temperature increasing braking efficiency and brake system longevity. Each cushion comprises a resilient body which is further comprised of either a material, such as an elastomeric pad, or a structure such as a compressible spring or other apparatus.

14 Claims, 6 Drawing Sheets

(56) References Cited

U.S. PATENT DOCUMENTS

| | | | |
|---|---|---|---|
| 5,538,104 A | 7/1996 | Katz et al. | |
| 5,586,626 A * | 12/1996 | Dolbear et al. | 188/250 B |
| 5,762,166 A | 6/1998 | Yano et al. | |
| 5,816,370 A | 10/1998 | Verbeeten et al. | |
| 5,823,301 A | 10/1998 | Bildner et al. | |
| 5,842,546 A | 12/1998 | Biswas | |
| 5,878,848 A | 3/1999 | Zhang | |
| 5,975,252 A | 11/1999 | Suzuki et al. | |
| 6,085,636 A | 7/2000 | Ruckert et al. | |
| 6,119,820 A | 9/2000 | Steptoe et al. | |
| 6,170,620 B1 | 1/2001 | Akita et al. | |
| 6,213,257 B1 * | 4/2001 | Yano et al. | 188/73.37 |
| 6,247,561 B1 * | 6/2001 | Doi et al. | 188/73.39 |
| 6,256,858 B1 | 7/2001 | Brosilow | |
| 6,283,258 B1 | 9/2001 | Chen et al. | |
| 6,315,091 B1 | 11/2001 | Nilsen et al. | |
| 6,322,160 B1 | 11/2001 | Loh et al. | |
| 6,349,803 B2 | 2/2002 | Brosilow | |
| 6,419,054 B1 | 7/2002 | Schulba | |
| 6,446,770 B2 | 9/2002 | Qian et al. | |
| 6,481,545 B1 | 11/2002 | Yano et al. | |
| 6,491,139 B1 | 12/2002 | Budica | |
| 6,508,340 B1 | 1/2003 | Bunker | |
| 6,578,678 B2 | 6/2003 | Lee | |
| 6,722,476 B1 | 4/2004 | Cornolti | |
| 6,796,405 B2 | 9/2004 | Ruiz | |
| 2003/0221919 A1 | 12/2003 | Kumamoto et al. | |
| 2004/0035651 A1 | 2/2004 | Renauld | |

OTHER PUBLICATIONS

Annual Book of ASTM Standards, Rubber, Natural and Synthetic—General Test Methods; Carbon Black, Section 9, vol. 09.01, ASTM, Philadelphia 2006, test D 395.

* cited by examiner

DISC BRAKE PAD CUSHIONS

CROSS-REFERENCE TO RELATED APPLICATION

This is a continuation-in-part of U.S. patent application Ser. No. 11/166,569 filed Jun. 25, 2005 now abandoned.

BACKGROUND OF THE INVENTION

Disc brake systems are well known, having been used extensively in the automotive industry. These systems are produced in a wide variety of sizes, types, and configurations, but the basic function of disc brakes is to convert kinetic energy, the energy of motion, into thermal energy, or heat. As designed, the friction between disc brake pads and brake rotors during braking generates large quantities of heat as brake systems convert kinetic energy into heat to slow or stop moving vehicles.

Nearly all disc brake systems are comprised of certain basic components. Among them is a caliper that surrounds at least a portion of a brake rotor. Mounted in the caliper are brake pads which are designed to press against the rotor causing the disc brake to slow the vehicle using the brake system. The pressing action is accomplished by a force producing element, usually a hydraulic system, which causes one or more brake pistons to press against at least one brake pad forcing the pad against the rotor and causing frictional forces to change the kinetic energy of the vehicle into heat.

Disc brakes can generate intense heat creating thermal gradients of several hundred degrees between disc brake system parts and their surroundings. This intense heat can adversely affect mechanical and hydraulic systems. As part of the ongoing effort to improve brake efficiency and increase brake system longevity, many methods and devices have been developed to help dissipate the intense heat generated during braking. In addition, various approaches have been developed to insulate and prevent boiling of brake fluid from the heat generated.

The problem of heat generation during braking is made much worse than it otherwise would be by irregularities in brake rotors. As a common problem with disc brakes, irregularities cause generation of excessive heat at brake pad to rotor interfaces. The problem arises as the rotors are forced between opposing brake pads during braking. The irregularities cause uneven frictional drag resulting in excessive braking temperatures and in turn resulting in significant adverse effects on braking efficiency and brake system longevity.

The problem is endemic to disc brakes because it is unavoidable that rotors distort during use. All rotors develop irregularities on their friction faces. These irregularities are sometimes referred to as high spots, a term that can apply to any type of rotor irregularity, warping, or rotor disc thickness variation.

All types of rotor distortion have the same effect on braking dynamics. If not already present, high spots on rotor faces form and begin to grow in magnitude as soon as rotors are put into service. Although they tend to develop gradually during normal brake use, they begin to affect braking dynamics as soon as they begin to form and long before their presence becomes noticeable to drivers as a pulsating pedal.

When brakes are applied, and brake pads are pressed against rotating rotor faces, high spots on the rotor faces are forced to squeeze between the pads as the rotors rotate. The brake pads resist any lateral or backward movement of the pads perpendicular to and away from the face of the rotor. As the high spots on the rotor faces pass between pads applied during braking, severe and excessive frictional drag is produced. This generates much more heat than would be the case if there were no high spots on the rotors.

The fact that brake systems are designed to generate tremendous quantities of heat has obscured recognition of the role that rotor high spots play in the generation of excessive friction and heat.

Excessive heat generated by high-spot friction often is the underlying cause of reduced braking efficiency, accelerated brake wear, and other problems. These proxies comprise:

Extended stopping distance. During a typical braking cycle from brake application to brake release, temperatures at pad to rotor interfaces routinely climb above the efficiency threshold where braking efficiency is sharply reduced because the temperatures at the brake pad/rotor interface are above the design temperature for efficient braking. This lowers friction coefficients, reduces brake system efficiency, and extends normal stopping distances.

Brake fade. During heavy, frequent, or prolonged braking cycles, pad to rotor interface temperatures can reach or exceed 538 degrees Centigrade (C.) or 1,000 degrees Fahrenheit (F.), which results in the dangerous condition known as brake fade or loss of friction.

Accelerated pad wear. As braking temperatures increase, the rate of wear of brake friction material on brake pads also increases.

Rotor degradation. Rotors, when used at temperatures above the efficiency threshold, exhibit a greater tendency for scoring, glazing, cracking, and blue-spotting caused by localized hot spots.

Shortened caliper life. The service life of calipers is also shortened by excessive heat. Excessive heat is the primary cause of caliper boot and seal failure, and is the major factor in caliper seizing caused by heat-compromised lubricants.

Still other problems can be caused by severe frictional drag at high spots, which can be related more directly to frictional drag itself than to the excessive heat it generates. For example, during even moderate brake applications, because of the severe frictional drag which occurs at rotor high spots, there is an increased danger of one or more wheels locking up. When a wheel locks up, it nearly always occurs where a rotor high spot passes under a brake pad. High-spot friction can become greater than tire-to-road friction, especially when road surfaces are slippery or tires are worn. This danger becomes acute by the time high spots have grown to such proportions that they are noticeable to the driver as a pulsating pedal.

Another problem is sway. During any braking cycle, the frictional drag at high spots on rotating rotor faces creates an uneven transfer of braking torque through the tires to the roadway, which reduces vehicle stability and increases the tendency of the vehicle to sway, or exhibit uneven side-to-side stability. This effect is especially evident on unevenly-loaded or high-bodied vehicles.

The uneven transfer of braking torque through the tires to the roadway also stresses tire assemblies, which causes external tire problems such as cupping and contributes significantly to internal tire problems such as cord separation.

One method for solving the problems described above could involve increasing the size of disc brake systems by using larger contact area and thicker rotors along with larger area brake pads, which would require larger calipers and redesigned master cylinders and other brake system parts. This method would help eliminate the formation of high spots on rotor faces by improving the ratio of friction material area to vehicle weight and by increasing the heat-sink capabilities of brake assemblies, resulting in lower brake operating temperatures. However, this method is usually not used because it would add undesired weight to vehicles and would be prohibitively expensive to implement.

Another method could involve providing a cushion, such as a hydraulic accumulator, inside the brake hydraulic system, which, if designed and calibrated correctly, could reduce high-spot friction and provide more efficient braking. Several devices of this type have been proposed, but these devices are usually designed to absorb hydraulic shock, and do not allow for the role that high spots play in the generation of excessive heat during braking. However, even if such a device were designed and calibrated specifically to provide optimum high-spot friction compensation, it would likely find reluctant acceptance because of cost and liability issues.

A simple and cost-effective method for reducing the excessive and uneven heat caused by high spot friction is needed.

BRIEF DESCRIPTION OF THE INVENTION

A cushion for reducing uneven frictional drag between a disc brake pad and a disc brake rotor caused by irregularities on a friction face of the disc brake rotor is provided. The cushion is comprised of resilient material and is positioned to permit lateral movement of the brake pad as the disc brake pad passes over the irregularities of the friction face. In addition the cushion is further positioned to even the distribution of force exerted by the disc brake pad against the friction face to reduce excessive heating of the brake rotor.

An apparatus is provided for reducing uneven frictional drag between a disc brake pad and a brake rotor friction face due to irregularities on the brake rotor friction face. The apparatus comprises a brake caliper, a brake rotor having at least one friction face, a brake piston mounted in the caliper, sometimes called a brake caliper piston, for exerting force to press against the brake rotor friction face, a brake pad comprising a backing plate and a friction pad for receiving force from the brake piston to press against the brake rotor friction face, and a cushion disposed adjacent the brake pad backing plate in resilient communication with a force producing element of the brake comprising resilient material for absorbing lateral movement as the brake pad passes over the irregularities on the brake rotor friction face evening the distribution of force exerted by the brake pad against the brake rotor friction face to reduce brake heating.

A method for reducing heating in disc brakes due to irregularities on a friction surface of a brake rotor is described. The method is comprised of providing a disc brake system that is used on vehicles. The disc brake pads are removed from the disc brake system, and the contact areas between the disc brake pads and their caliper members are cleaned. Resilient cushions with characteristics of resilience that permit the resilient cushions to absorb lateral movement of the disc brake pads during braking caused by irregularities on the friction surface of the brake rotor are provided. The resilient cushions are secured in place between the disc brake pads and the caliper members that are in contact with the disc brake pads.

DETAILED DESCRIPTION OF THE INVENTION

Figure 1:
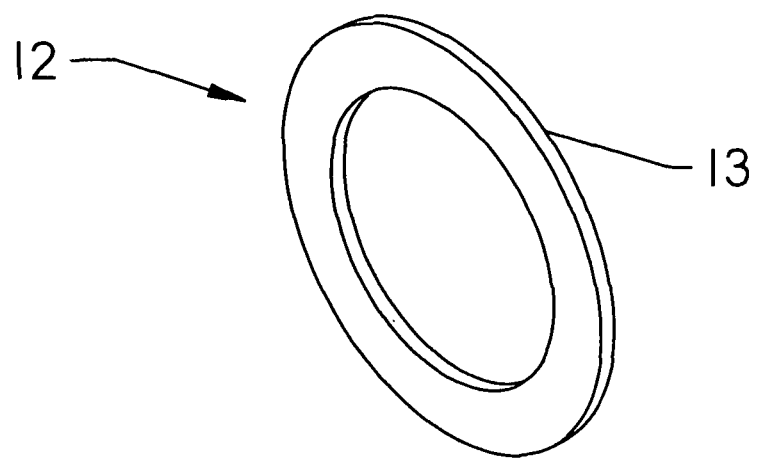
FIG. 1 is a cushion.

Severe localized frictional drag can develop in disc brakes as brake rotor irregularities, called high spots, are forced between the brake pads of disc brakes during braking. This can lead to extreme or excessive heating of the rotor, and the excessive heat can be the underlying cause of extended stopping distance, wheel lock-up, accelerated brake wear, tire wear, and other driving safety and consumer issues. Eliminating this source of excessive heating can resolve these problems and other problems associated with the excessive heat caused by high spots on brake rotors.

Brake systems operate at varying degrees of efficiency until friction interface temperatures reach an efficiency threshold at from about 205 C to about 232 C. Converting to the Fahrenheit scale, these temperatures would be from about 400 F to about 450 F. As interface temperatures continue to climb above this efficiency threshold, brake efficiency drops with the rising temperature.

The term excessive heat refers to temperatures and quantities of heat that are above optimum operating parameters for brakes. These are detrimental to brake efficiency and longevity.

The generation of excessive heat during braking due to high spots is a universal phenomenon requiring a solution. Preventing the generation of excessive heat during braking provides benefits both in terms of personal safety, because of increased braking efficiency, and of longevity.

In disc brakes irregularities or high spots are unavoidable because brake rotors distort during use owing to thermal expansion in the presence of the intense pressures, frictional drag, and other dimensional factors involved in braking action. As rotors repeatedly heat up and cool down, permanent irregularities develop on their friction faces. These irregularities are referred to as high spots. High spots begin to develop as soon as rotors are put into service. Although they tend to develop gradually during normal brake use, high spots begin to affect braking dynamics as soon as they begin to form. Such high spots occur before their presence becomes noticeable to drivers as a pulsation in the brake pedal.

The intense heat generated during braking causes thermal expansion of rotors, which primarily because of subsequent non-uniform rotor cooling, results in permanent irregularities on rotor friction faces. Non-uniform rotor cooling can be the result of a combination of factors. Among them are heat sinking in the area of brake pad to rotor contact such as happens when remaining stopped with brakes applied at a red light; excessive or unequal torque on lug nuts, which pulls the rotor out of shape as it cools; or shock cooling as happens when vehicles with warm or hot brakes are driven through deep puddles. Alone or in combination, the above factors cause irregularities or high spots sometimes termed warpage on rotor friction faces, even on rotors which begin their service life without any irregularities.

There are additional factors that can also affect the development of these irregularities on rotor friction faces during their service life. Among these are manufacturing imperfections. Many rotor manufacturers machine and package rotors before they are fully cured after casting. As the rotors finish curing in storage, they distort. Consequently, many rotors begin their service lives with irregularities of up to several thousandths of an inch.

Another factor is extreme overheating such as can happen in mountain driving, or during heavy or extended use. Other factors can be brake system component failure such as a sticking caliper or improper handling, machining, or mounting of rotors during brake service.

It is well known that liquids are not compressible. As applied in brake systems, this fact is used to create large forces hydraulically from the application of lesser amounts of force. In these hydraulic brake systems brake fluid, a liquid, is used to transfer the force of one's foot on the brake pedal through a small area piston to the inner surfaces of a brake system exposing all surfaces within the brake system to the same fluid pressure or force per unit area. The force applied to the brake pedal is applied over a small area of the fluid in the brake system and is transmitted equally to all surfaces in the brake system so that the pressure, or force per unit area, is equal on all surfaces. The force applied to the brake pedal can be multiplied many times if a part of the system, such as a brake caliper piston, has a larger surface area than the area of the brake pedal piston. The pressure created by the brake pedal over the small surface area of the brake pedal piston moves the larger surface with much greater force because the pressure over the larger surface is the same as that on the smaller one but the area of the brake piston is larger providing a larger force. For example, the pressure created by pushing on a 0.1 square inch column of fluid with 20 pounds could apply 2000 pounds of force to a 1 square inch piston.

In disc brake systems such forces press brake pads against the friction face of a brake rotor as the brake systems are pressurized to several hundred pounds per square inch. When hydraulic brake systems are pressurized, they are unable to respond to the lateral forces caused by the high spots on the friction face of brake rotors that are passing the brake pads. The high spots, or irregularities, are nonetheless forced past the brake pads by the moving rotor leading to the above described frictional drag, which causes excessive heat buildup.

When a mechanical cushion is provided between brake pads and the parts of a brake that apply force to the brake pads, high spot friction on the friction face of a brake rotor can be significantly reduced. This lowers operating temperatures and increases brake system efficiency. These cushions have characteristics of resilience that allow brake pads to follow the irregularities moving laterally in a direction substantially perpendicular to the friction face of the brake rotor to ride over the high spots on rotor faces. These characteristics substantially reduce excessive pressure at the high spots. The reduction in the otherwise relatively extreme pressure encountered at the high spots during braking substantially reduces the excessive heat generated when high spots are forced past the pads of a disc brake.

One effect of the cushions is to substantially reduce overall braking temperature. The pressure exerted by the brake pads on the brake rotor is evened allowing uniform heating of the brake assembly, reducing further high spot growth due to uneven brake rotor heating, increasing the effectiveness in brake stopping power, and improving the overall performance, life and safety of the brake system.

The design of the cushions determines whether or not they will be effective in reducing excessive heat generation. The material used to form the cushions has a. resiliency, the ability to return to near original form after compression, which will allow the material to follow and respond to high spots at rates and frequencies encountered during wheel braking on vehicles. Additionally, the material has to withstand the mechanical and temperature stresses associated with braking.

Studies of materials that function successfully in cushion design have been made. Various material properties have been measured and related to successful application in cushions.

With regard to resiliency, a property called Compression Set has been measured and found to be important in the design of cushions. Compression Set refers to permanent deformations that occur in materials after they have been compressed. By definition Compression Set is the ratio of the original or undeformed thickness of a sample less the final thickness after compression to the original thickness less the compressed thickness during compression, expressed as a percentage. For example, a material with a 20% Compression Set after compression retains 20% of the deformation that it experiences during compression. A standard test has been devised to measure Compression Set. It is American Society of Testing and Materials (ASTM) test D 395, Standard Test Methods for Rubber Property-Compression Set, as defined in the *Annual Book of ASTM Standards, Rubber, Natural and Synthetic—General Test Methods, Carbon Black*, Section 9, Vol. 09.01, ASTM, Philadelphia 2006, which is incorporated herein by reference.

Although the test is a static test and the cushions in application experience a cyclical deformation, it has been found that test ASTM D 395 adequately predicts features of the resiliency needed to achieve adequate cushioning. To achieve the resiliency needed for adequate cushion performance, it is found that appropriate test conditions for ASTM D 395, using Method B, are 200 C for 70 hours. When tested under these conditions, it is found that the best materials for the application have a Compression Set of less than 15%, but that materials with a Compression Set of up to as much as 30% can work adequately for cushioning disc brakes.

Arising from studies of dynamic mechanical response in materials, an industry accepted quantity called Tan Delta is a measure of the relative resilient response of a material, usually, but not always, a polymer. Tan Delta corresponds to the ratio of viscous modulus, a measure of energy loss, to elastic or Young's modulus, a measure of energy storage, for a material. As used, Tan Delta is a measure of how rapidly a material can recover to near original form after being compressed. In general smaller values of Tan Delta correspond to faster resilient response or recovery to initial condition after compression. Details of how these dynamic properties of a material are measured and interpreted can be found in *Lectures on Viscoelasticity Theory* by A. C. Dipkin, Springer-Verlag, New York, 1972, which is incorporated herein by reference.

The frequencies of resilient operation necessary for heat reducing cushions to be effective during braking are below about 500 Hz. The material comprising the cushions has to have the resilience necessary to be able to compress and recover from compression at these frequencies. The capability to compress and rebound at these frequencies makes the cushions effective at evening brake pad pressure on the rotor as the high spots of the rotor pass between the brake pads because most disc brake systems are designed with opposing disc brake pads on opposite sides of the rotor.

Though in most cases there is only one high spot on each side of a brake rotor, sometimes brake rotors can have multiple high spots. Multiple high spots are particularly likely to occur when there is more than one cause giving rise to the high spots. For example, when manufacturing defects are present in rotors causing high spots and then other high spots develop due to improper wheel lug torque or thermal shocking, a plurality of high spots occurs.

Whatever the cause of the high spots, the frequency response of the brake cushion has to be adequate to respond to the plurality of high spots in each revolution of the rotor so that the brake pad can move laterally with the cushion absorbing the displacements caused by the high spots and evening the distribution of force over the face of the rotor as it passes under the brake pad. In the case of a plurality of irregularities the necessary resilient response of the cushion material needs to be a multiple of the revolution rate of the rotor.

Since typical brake rotor revolutions on most vehicles, especially vehicles designed for use on public highways, do not exceed about 30 Hz, and more than three or four high spots per rotor is unlikely, most applications have a maximum frequency requirement of about 120 Hz. Setting a resilient response requirement of 500 Hz on materials used to make the cushions is adequate for nearly all high spot conditions encountered, including high speed racing or aircraft applications.

Studies have been performed to further specify the material properties that are required of these materials. With regard to Tan Delta the studies have been performed using a Rheometrics Dynamic Analyzer RDA II from TA Instruments, 109 Lukens Drive, New Castle, Del. It is found that an ideal polymeric material for the brake cushion can be specified using physical properties and would ideally have its Tan Delta between about 0.02 and about 0.05 over the temperature range from about 93 C to about 260 C or about 200 F to about 500 F for frequencies ranging from about 6 Hz to about 20 Hz. More generally, the cushions can work adequately when comprised of materials having values of Tan Delta ranging from about 0.01 to about 0.4 when the frequency is about 10 Hz to about 30 Hz and the temperature of the material rises to from about 93 C to about 204 C or about 200 F to about 400 F.

It should be noted that other devices often referred to as shims have been used to eliminate brake squeal by placing them between a caliper member and a brake pad. However, these shims are placed solely for the purpose of eliminating noise or brake squeal originating from the onset of audio frequency oscillations in disc brake elements as the brake pads pass over the rotor in contact with it and are a facet of naturally occurring resonances in the rotor excited by the brake pad. The shims do not provide cushioning. They are designed only to act as sound dampers at audio frequencies and usually operate in a frequency range of from about 1,000 Hz, to about 12,000 Hz. These frequencies correspond to displacements in the brake rotors equivalent to from about 1 micron to about 10 microns. A micron is one millionth of a meter. The shims do not alleviate brake heating problems and are not designed to do so. Because they are designed to be sound dampers, the shims do not have features of resilience that allow them to move synchronously with the variations in rotor thickness. Unlike brake cushions whose resilience is chosen to allow synchronous response with high spots and so eliminate excessive heating, the shims only damp audio frequency excitations in the rotors. Further, in most cases shims are too thin and are made of materials with incorrect resilience to accommodate the lateral movement needed to reduce excessive heating. Unlike the invention they are not designed for and do not allow the pad to back off and glide over a high spot when it passes the pad.

FIG. 1 is an embodiment of a typical inboard brake pad cushion 12. The cushion is comprised of a polymeric material having a Tan Delta of about 0.04. It can be a cushion of arbitrary shape 13 and in the case of FIG. 1 is formed in a circular shape to fit the shape of the face of the caliper piston 47 in FIG. 5, as it presses against the cushion 12 and in turn against the backing plate 34 of the brake pad 32.

Figure 2:
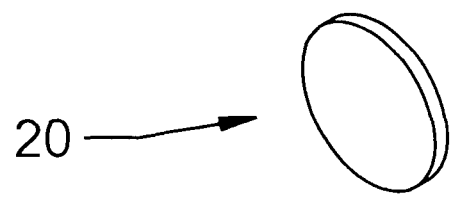
FIG. 2 is a cushion.
Figure 5:
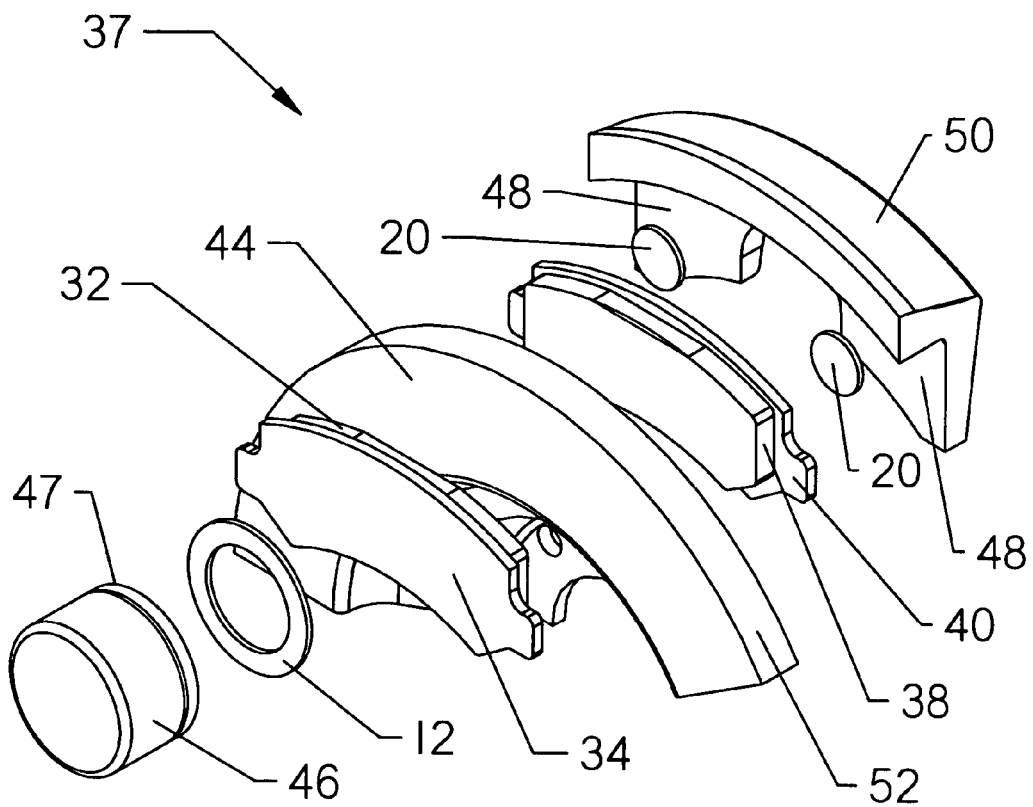
FIG. 5 is the moving parts of a brake.
Figure 9:
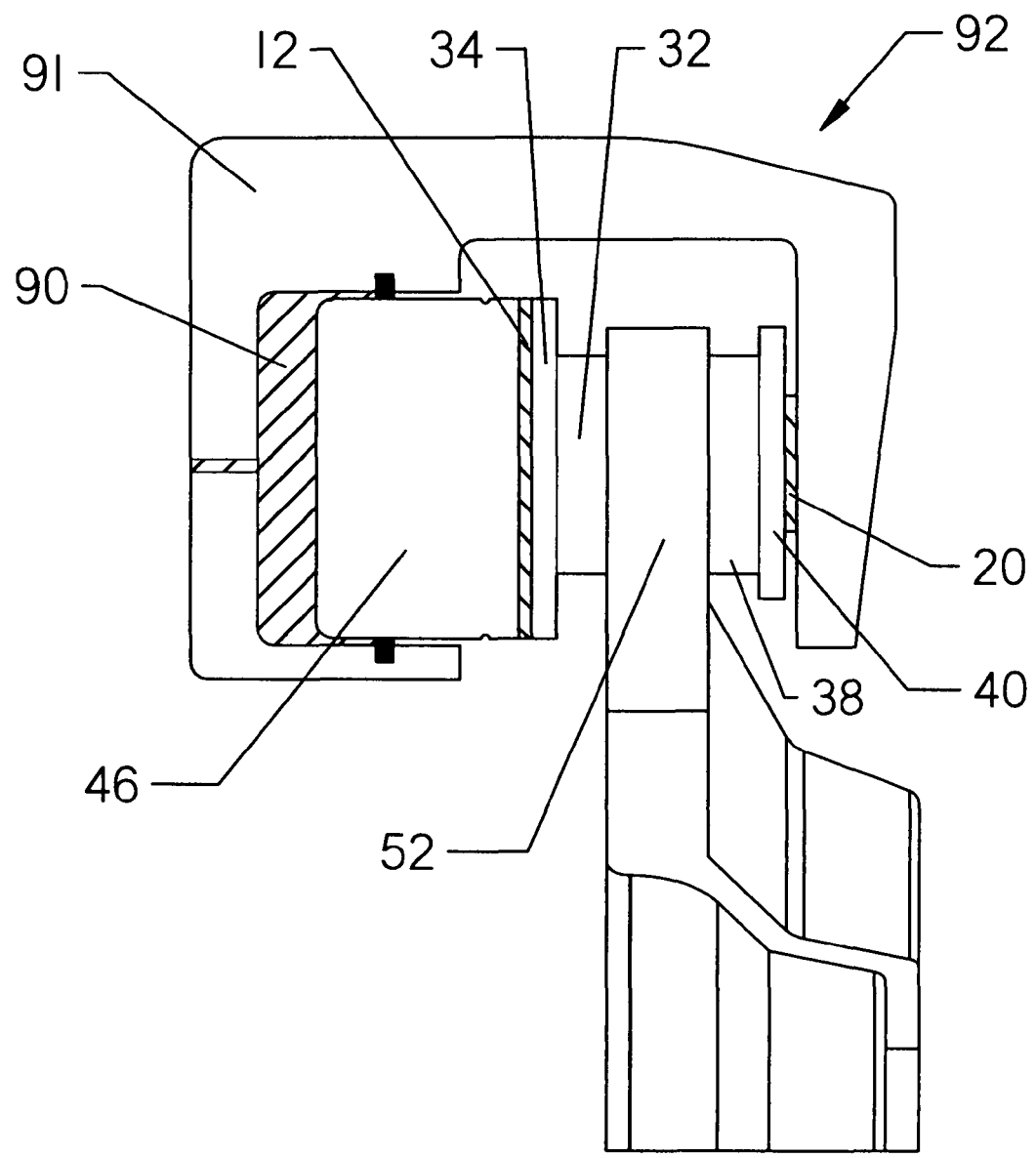
FIG. 9 is a single piston sliding caliper brake.

FIG. 9 is an embodiment using a single piston sliding caliper brake 92 of the type commonly found in automotive applications. Hydraulic fluid enters a piston cylinder 90 which is a part of the caliper body 91. The piston 46, also shown in FIG. 5, is mounted in a piston cylinder 90 that is a part of the caliper body 91 as shown in FIG. 9. FIG. 5 shows a part of the caliper body 91 which is numbered 50. As pressure is applied to the hydraulic fluid in the brake piston cylinder 90, the piston 46 is forced against the brake pad backing plate 34 and the caliper body 91 is pushed in the opposite direction to the direction of movement of the piston 46 causing the caliper body 91 to move toward the rotor 52 as the piston 46 moves toward the rotor 52 from the opposite direction. Typically, the inboard brake pad cushion 12 is placed between the piston 46 and the brake pad backing plate 34. As mentioned above, in the embodiment shown in FIG. 9 the action of the fluid in the piston cylinder pushes the caliper body 91 in a direction opposite that of the direction of movement of the brake piston 46 forcing the outboard brake pad 38 toward the brake rotor 52. In the embodiment the outboard cushion 20, also shown in FIG. 2, is placed between the part of the brake caliper body 91 that produces force on the brake pad backing plate 40 and the backing plate 40. In the case of this single piston sliding caliper brake 92 the described action of the hydraulic fluid causes the brake to be applied.

When the brake caliper is movable, called a sliding caliper, cushioning can be provided on either side of the rotor to achieve the benefits of cushioning. The opposite side of the rotor need not be cushioned. Customarily, however, both sides are cushioned as shown in FIG. 9.

A variety of brake designs is possible. Sliding caliper brakes have one or more movable pistons mounted in the caliper body on either the inboard or outboard side of the vehicle, but not on both sides. Also, in sliding caliper brakes the body of the caliper is always free to move in response to piston force. If a plurality of pistons is used in a sliding caliper brake system, each piston is cushioned to achieve the reduction in excessive heating.

In another embodiment, some brakes comprise a fixed caliper wherein the caliper remains stationary and a plurality of pistons is used on both sides of the rotor. In this case cushioning is needed for each piston to reduce excessive heat.

As shown in FIGS. 5 and 9, most single brake piston disc brakes have the piston 46 on the inboard side of the brake rotor 52. The brake cushion 12 can be effective in eliminating excessive heating if used alone without other cushions. It should be noted that the brake cushion 12 can be of other shapes so long as the cushioning material covers the piston 46 as it contacts the brake pad backing plate 34.

However, cushioning need not be only on the brake piston 46 side of the rotor 52. FIG. 5 shows the force providing and other moving elements of a typical single piston 46 disc brake assembly 37. The caliper fingers 48 provide a force on the brake pad backing plate 40 as the hydraulically operated brake presses them against the brake pad backing plate 40. As shown in the embodiment of FIG. 5, cushions 20 can be placed on the outboard caliper 50 side of disc brake assembly 37 at the contact points where the brake pad backing plate 40 contacts the caliper 50.

The embodiment shown in FIG. 2 is one such cushion 20. Made of the same material as the cushion 12 shown in FIG. 1, this cushion 20 is formed to fit the usually flat contact points on the outboard side of the rotor between FIG. 5's brake pad 40 and the caliper finger 48. Usually, the outboard side of the disc brake assembly comprises a plurality of contact points with the brake pad, and one cushion 20 is necessary at each of the brake pad backing plate 40/caliper 50 contact points to absorb and even the varying forces encountered eliminating excessive heating as the high spots pass the brake pad 38.

Although in most cases cushioning either side of the rotor 52 will effectively reduce excessive heating, it is usual to provide a set of brake pad cushions for most applications which comprises inboard and outboard pad cushions made from identical material for any the particular application. This has the benefit of smoother operation and helps maintain the cushioning needed to reduce excessive heating should one of the cushions fail or become dislodged.

Figure 3A:
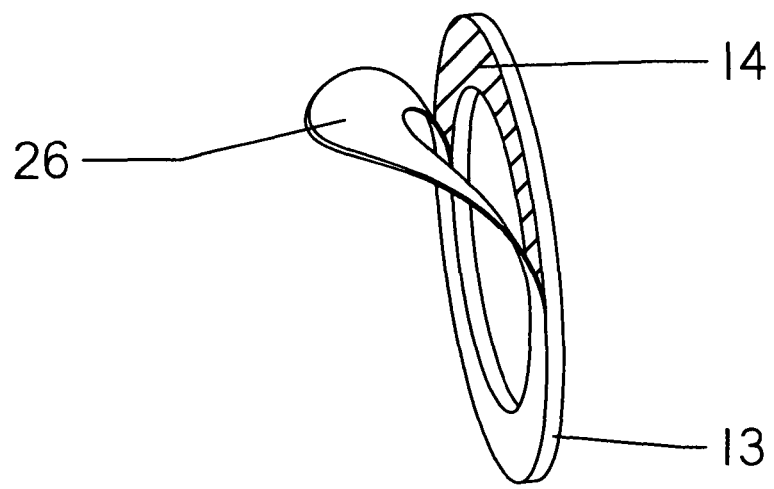
FIG. 3A is a modified cushion.
Figure 3B:
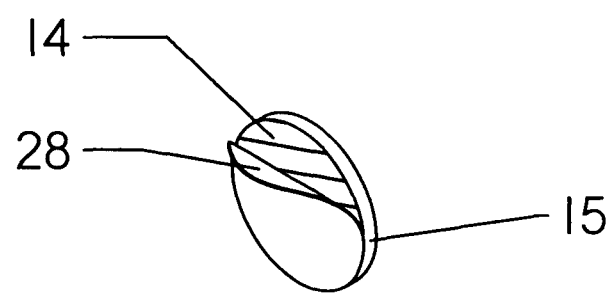
FIG. 3B is a modified cushion.

In another embodiment shown in FIGS. 3A and 3B, an adhesive 14 can be applied to the surface of arbitrarily shaped cushions 13, 15 and can be protected with a cover 26, 28 until the surface of the cushion 13, 15 with the adhesive 14 is uncovered during installation and placed so that the adhesive 14 maintains the cushion 13, 15 in its desired location.

Figure 4A:
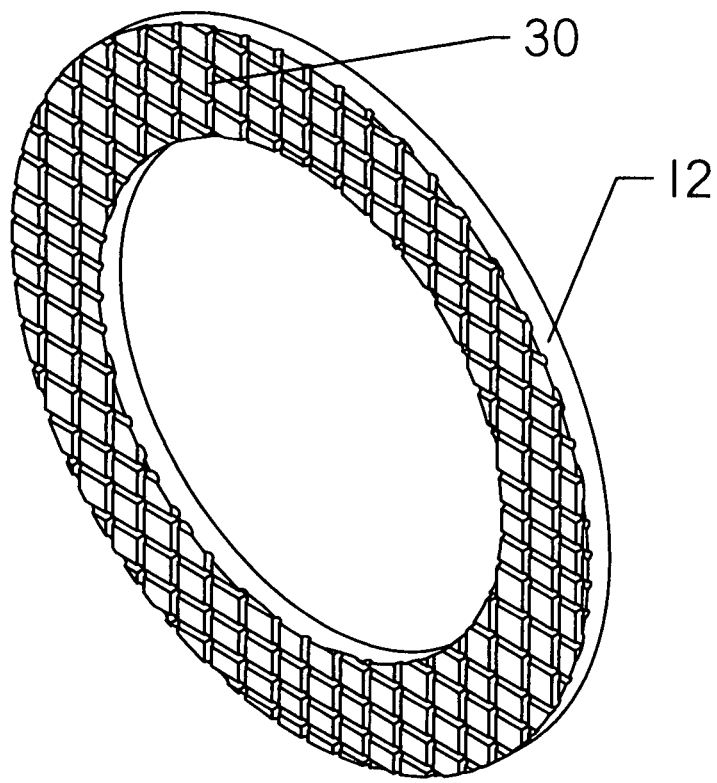
FIG. 4A is a modified cushion.
Figure 4B:
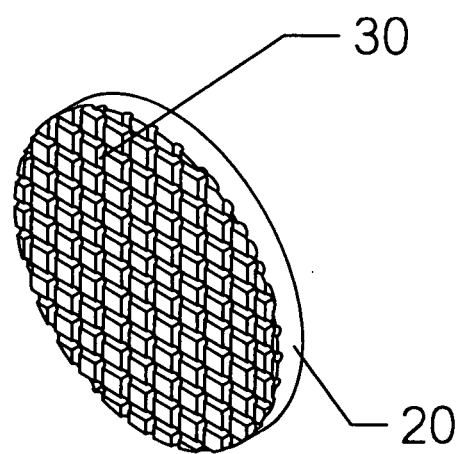
FIG. 4B is a modified cushion.

In the embodiment shown in FIGS. 4A and 4B, slits 30 on one face of each of the cushions 12 and 20, can be used to compensate for shear forces during braking. These shear forces can be caused, for example, by worn brake pad abutments. As noted above, the overall placement of the brake pad cushions 12, 20 in a typical disc brake system 37 is illustrated in FIG. 5.

In one embodiment, the cushions 12, 20 are cut from a sheet of, or molded from a mixture of, elastomeric material which is a blend of natural rubber (NR) and polybutadiene rubber (BR) in a ratio of about 75% NR to about 25% BR. Small amounts of aromatic amines (about 1-4 parts per hundred rubber) are also incorporated in the blend to prevent the possibility of metal-catalyzed oxidation, which could otherwise occur when the cushions are mounted on brake systems using cast-iron calipers. Such a compound can be obtained from Goodyear Tire and Rubber Company of Akron, Ohio, USA, or from other polymer or rubber producing companies.

Cushions made from this particular elastomeric compound provide very high rebound resilience with very low heat buildup from high spot deformation. They exhibit very low compression set and stress relaxation characteristics, and very good resistance to abrasion, tear, and fatigue. However, although cushions made from this particular compound perform well, maintain their integrity in service, provide the intended benefits, and comprise as a side benefit squeal damping, in many applications the cushions can be made from other compounds. There are many elastomeric compounds, natural and synthetic, which could be used to make cushions that could satisfy the performance objectives set forth herein in an acceptable way. For example, disc brake systems in severe-service applications such as racing cars or aircraft, which encounter extremely high braking temperatures, can benefit from cushions which have been designed specifically to operate in their particularly rigorous environments.

In another embodiment, the inboard brake pad cushion 12 of FIGS. 1 and 5 is shaped like a flat washer, open in the center. The inside and outside diameters of the cushion 12, as well as the difference between the inside and outside diameters and the width of the cushion 12 material, can vary by application. Inboard cushion 12 is designed to match and cover the contact pattern of a caliper piston 46 on the backing plate 34 of its brake pad 32 causing the "O" shape shown in FIGS. 1 and 5. These cushions can be of arbitrary shape 13, 15 and can have various shapes, sizes, or configurations as needed. A consideration concerning the shape and size of inboard cushions is that there be adequate cushioning between a caliper piston 46 and the backing plate 34 of its brake pad 32 to provide appropriate resilience during braking.

In the embodiment, the outboard brake pad cushions 20 of FIGS. 2 and 5 are shaped like discs. For most applications, two outboard cushions 20 are required, one for each caliper finger 48. The diameter of the cushions can vary by application, but is usually within the range of about 25 mm to about 30 mm. Outboard cushions 20 are designed to provide cushioning in the areas of contact between caliper fingers 48 and the backing plate 40 of their adjacent brake pad 38. These cushions can be given various shapes, sizes, and configurations as long as there is adequate cushioning between the caliper fingers 48 and the backing plate 40 of the outboard brake pad 38 to provide appropriate resilience during braking.

Brake systems which incorporate fixed calipers with opposed pistons use the above inboard cushion 12 design for each piston. In most cases pistons which apply force to an outboard brake pad also use designs that are substantially the same. In embodiments where a plurality of brake pistons is used, each piston should be cushioned.

Cushions 13 and 15, which are identical to one another in thickness for any single application, can vary in thickness from application to application. Typical thicknesses range from about 1.6 mm to about 3.6 mm. Applications such as large motor homes, busses, and trucks generally use somewhat thicker cushions 13, 15 because the high spots which develop on their rotor friction faces 44 become proportionately larger than those in applications such as automobiles, pickup trucks, and motorcycles. The latter develop proportionately smaller high spots and can use thinner cushions. However, there always needs to be an adequate thickness of cushion material with the appropriate resilience to accommodate the high spots that typically form on the rotor friction faces of any particular application.

There are many methods for attaching arbitrarily shaped cushions 13, 15 such as using adhesive on one or both sides of the cushions 13, 15 as shown in FIG. 3, using clips of various designs, using rivets, screws, or bolts, or providing mating physical features on the cushions and/or on their adjacent caliper members or brake pad backing plates which serve to lock them together. Still other methods for attaching or securing cushions in place during brake pad or caliper manufacture can easily be devised. This would allow caliper assemblies or sets of brake pads to be sold with cushions attached or included in the packaging. The cushions could be designed to remain securely in place throughout the service life of the brake pads.

In yet another embodiment, the inboard cushion 12 can be adhered either to the face 47 of its piston 46 or to the backing plate 34 of its adjacent brake pad 32, and the outboard cushions 20 can be adhered either to the caliper fingers 48 or to the backing plate 40 of their adjacent brake pad 38 of FIG. 5.

Making use of the brake pad cushions 12 and 20 in FIGS. 1 and 2 to improve braking efficiency is a simple matter of properly installing the cushions 12, 20 in a disc brake system. The cushions 12, 20 can be installed at the time brake pads 32, 38 are replaced or at any time during brake pad life. Any person possessing the skill and the tools necessary to remove and replace a set of disc brake pads 32, 38 can easily and safely install a set of the brake pad cushions 12, 20.

In another embodiment installation involves following the vehicle manufacturer's instructions for replacing disc brake pads 32, 38, with the following simple addition. After making sure that brake pad backing plates 34 and 40, caliper piston face 47, and caliper fingers 48 are clean and dry, peel and stick the brake pad cushions shown in FIGS. 3A and 3B in place. Inboard brake pad cushion 12 fastens either to the caliper piston face 47 or to the contact area of the caliper piston face 47 on the inboard brake pad backing plate 34. In the latter case the inboard cushion 12 can be shaped to fit the area where the piston face 47 contacts the brake pad backing plate 34 to provide easier positioning. Outboard brake pad cushions 20 fasten either to the caliper fingers 48 or to the outboard brake pad backing plate 40, in the contact area of the fingers 48 with the brake pad backing plate 40. As with the inboard cushion 12, in the latter case the outboard cushion can be shaped to fit the area where the caliper 50 contact points contact the brake pad backing plate 40 to provide easier positioning. Peel and stick adhesive can be provided on one or both sides of the cushions 12, 20.

Brake systems which incorporate fixed calipers with opposed pistons can use designs similar to the above inboard cushion 12 with or without adhesive for each piston.

Once the installation is complete, the cushions become functional. During each instance in which the brakes are applied, the cushions instantly and automatically absorb any lateral movement of the brake pads, which is caused by high spots on the rotating rotor faces. Because of their unique characteristics of resilience, the cushions are able to absorb the lateral pad movement caused by rotor high spots, eliminating the transfer of this motion to the caliper pistons and/or caliper fingers. The result of this cushioning is that the brake pads are allowed to follow the irregularities riding over the high spots on the rotor friction faces during braking, which significantly reduces the severe frictional drag at rotor high spots. Reduced frictional drag means lower braking temperature, and lower braking temperature translates directly into increased braking efficiency, brake system longevity and performance.

The invention can be practiced using a variety of structures and/or materials. One consideration in cushion manufacture is whether the cushions are capable of providing adequate and appropriate resilience for brake pads during braking. It will be appreciated that although the embodiments described have been discussed using components chosen for considerations such as performance, cost, and convenience, other components can also be appropriately implemented.

Figure 6A:
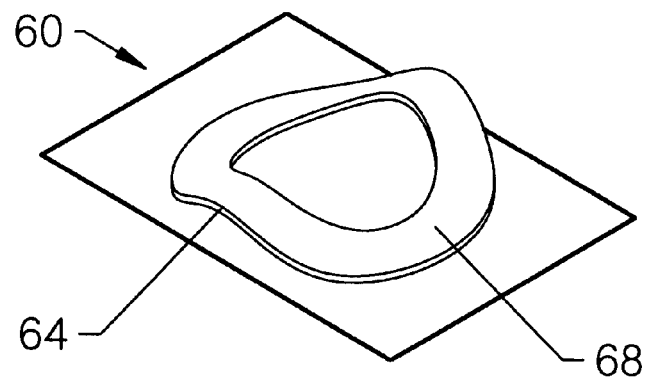
FIG. 6A is a wave spring cushion.
Figure 6B:
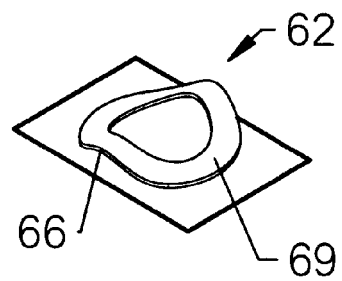
FIG. 6B is a wave spring cushion.

In another embodiment FIGS. 6A and 6B show inboard wave spring cushion 60 and outboard wave spring cushion 62, respectively. A wave spring 60, 62 is made from spring material 68, 69 that is formed with a deflection 64, 66 through the material that makes it appear from the side as though it has been bent along an axis. The effect of this is to make the material look from the side as though a transverse wave stopped as it was passing through the material. A wave spring 60, 62 can be used in compression to provide spring action as the spring material 68, 69 is forced closer to the plane from which it appears to have been formed or bent and the spring 60, 62 tries to return to its apparent bent or wave shape.

Wave spring cushions 60, 62 can be comprised of spring metal or other deformable material that can meet resilience, temperature, and frequency requirements as discussed above. Further, the cushions 60, 62 can be designed and calibrated to provide adequate and appropriate resilience during braking that meet the criteria described above.

The wave spring cushions can be secured in place by a variety of conventional methods including but not limited to spot welding, clips of various designs, rivets, screws, and mating physical features.

The location of the wave springs in a typical disc brake system is substantially the same as the location of the embodiments described above, and the operation requirements during braking are substantially the same as that of the embodiments that employ materials discussed above.

Figure 7:
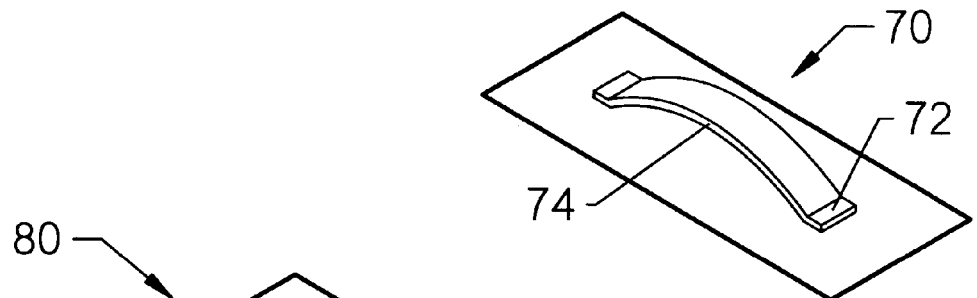
FIG. 7 is a leaf spring cushion.

Providing yet another embodiment, FIG. 7 shows a typical leaf spring 70 which can be designed, calibrated, and configured to provide adequate and appropriate resilience for inboard and outboard brake pads during braking. A leaf spring is made of a strip of spring material 72 that is formed to have a deflected portion 74. Spring action in compression occurs when the deflected portion 74 is pressed down toward a supporting surface or structure adjacent the deflection and tries to return to its original shape.

Leaf springs 70 can be secured in place by a variety of conventional methods, similar to those listed for the wave springs 60, 62 described above. The location and operation of the leaf springs 70 in a typical disc brake system is substantially the same as that of the embodiments described above. The leaf springs cushion the brake pad to provide even pressure on the rotor and allow the brake pads to move laterally to ride over high spots.

Figure 8A:
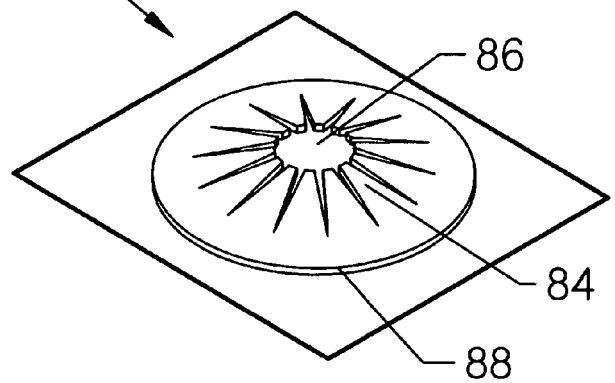
FIG. 8A is a convex washer cushion
Figure 8B:
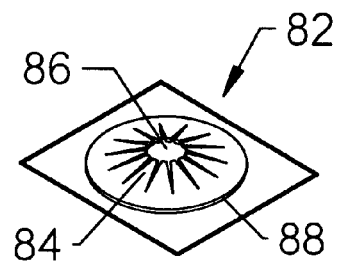
FIG. 8B is a convex washer cushion.

In another embodiment FIGS. 8A and 8B show inboard convex washer cushion 80 and outboard convex washer cushion 82, respectively, which can be designed and calibrated to provide adequate and appropriate resilience during braking. The convex washers are comprised of flat discs of spring material that are formed with raised teeth 84 usually around a central hole 86. Cushion action in compression occurs when the teeth 84 are pressed down toward the surface or structure supporting the perimeter 88 and try to return to their original shape.

The convex washers can be secured in place by a variety of conventional methods similar to those listed for the wave springs described above. The location and operation of the convex washers in a typical disc brake system is substantially the same as that of the embodiments described above.

In other embodiments the wave springs, leaf springs and convex washers of FIGS. 6A, 6B, 7, 8A and 8B can be combined with the polymeric materials described above by embedding them in the polymeric materials. This helps absorb lateral flex from the passage of high spots through lateral movement and evens the pressure exerted by the brake pads over the face of the rotors. Combining the cushioning materials in this way adds the positive characteristics of both metal cushions and polymeric cushions while limiting the generation of excessive heat and minimizing any sound generated as the cushions move. For example, in combinations of the various metal embodiments and the elastomeric embodiments, any tendency of metal parts to rattle as they move against each other can be controlled or be eliminated. In most cases each embodiment is designed and tuned for the type of disc brake system on which it is used.

All the embodiments can provide a range of benefits resulting from the reduction of excessive heat generation. Comprising them are shortened stopping distance, delay or prevention of the onset of brake fade, reduced brake pad wear and extension of service life of brake rotors and calipers, reduction of wheel lock-up often caused by frictional drag at high spots on rotor faces, and smoothing the transfer of braking torque through the tires to the roadway increasing vehicle stability, lessening tire strain during braking, and extending tire life. It should be recognized that brake cushions provide an opportunity to achieve each of these benefits when needed, and the use of brake cushions to achieve one of the benefits often adds a combination of benefits to the braking situation.

In one embodiment shorter stopping distance is desired for an automotive application and is provided by the brake pad cushions. In the embodiment the cushions are installed on both sides of the rotor in a single piston sliding caliper brake system. The cushions even and smooth the action of the brake pads on the rotor substantially decreasing variable force as the pads contact the friction face of the rotors. This leads to more uniform friction on the friction face of the rotors. In turn smooth, uniform conversion of kinetic energy to heat results, avoiding development of hot spots which lead to loss of braking efficiency at the hot spots and quickly over the entire friction surface of the rotors as the heat rapidly spreads across their surfaces.

As a result, new levels of safety are achieved and stopping distances are reduced. Shorter stopping distance also means shorter stopping time, because more efficient deceleration means faster deceleration.

Another embodiment uses the improved brake performance provided by the cushions to reduce excessive heating as described above to allow smaller sized brakes to be employed for stopping vehicles. This embodiment can be important to engineers and to brake manufacturers. Smaller sized brake systems can lead to improvements in overall vehicle design by limiting the space required for brake systems and can provide answers to challenging engineering applications.

For example, vehicles with regenerative braking systems, which are used to recover kinetic energy in useful form, such as in the form of electrically stored battery energy, often need to have regular disc brakes operating in parallel with the regenerative brakes. This is necessary to provide improved emergency stopping capabilities. The use of cushions can provide enhanced performance so that the disc brakes can be employed more advantageously as part of the overall brake system.

In another embodiment manufacturing procedures can be improved when smaller brake systems can be used in a manufacturing, process. It is generally easier to handle and to assemble smaller brake systems than it is to handle larger brake assemblies during manufacturing. Designing brakes with cushions can help minimize sizes of brake systems.

In yet another embodiment brake cushions can eliminate the reduced braking efficiency due to excessive heat, called brake fade. During heavy, frequent, or prolonged braking cycles, the coefficient of friction between pad and rotor surfaces is greatly diminished due to the excessive heat that is produced. The phenomenon can be experienced with any braking system that depends on a rotor friction face for its braking. The action of the brake pad cushions reduces severe frictional drag at rotor high spots, keeping braking temperatures much lower and preventing, or at least delaying and lessening, the degree of brake fade.

Providing another embodiment, cushions can be used to reduce lateral sway. During braking, the cushions provide smoother stopping with fewer consequences from irregularities in brake rotors. This leads to a smooth transfer of braking torque through the tires to the roadway making for a smoother stop. Stopping smoothly significantly reduces lateral vehicle sway. This embodiment can be important for unevenly-loaded or high-bodied vehicles. It helps compensate for changes in the center of gravity as vehicles are off-loaded, and for variations in tire pressures and other unexpected or unusual conditions. Smoother braking action also provides an improvement in steering control during hard braking, and braking stability when towing.

In yet another embodiment cushions can be used in brake systems that are susceptible to wheel lock-up and the skidding that usually results from it. When wheel lock-up occurs, the brakes are usually stopped and locked at a high spot as it is being forced past a brake pad. The action of the cushions during braking allows the high spots to pass the brake pads as the lateral movement of the high spots is absorbed by the cushions reducing severe frictional drag at rotor high spots. Because of the resulting smoothing and evening of braking action the incidence of wheel lockup and skidding is substantially reduced.

In another embodiment when used on vehicles equipped with Anti-lock Braking Systems (ABS), the cushions complement ABS action during stops. The ABS action rapidly pulses brake application on and off. The cushions can help absorb the effects of irregularities in the rotor friction face during the rapid pulsing of the ABS system. This leads to reduced jerking and a smoother and a shorter stop.

In yet another embodiment brake cushions can reduce the number and/or severity of accidents. Brake performance is a critical factor in over 50% of accidents involving fatalities. The brake pad cushions, because they provide both shorter and quicker stops, can be a significant factor in reducing not only fatalities, but also injuries and property damage.

The action of pad cushions during braking reduces the frictional drag at rotor high spots, which keeps friction interface temperatures much lower. Lower temperatures equal lower rates of wear for friction components such as pads and rotors. As average braking temperatures increase, brake pad life expectancy correspondingly decreases.

In one embodiment where brake pad life needs to be extended, the use of cushions to reduce average braking temperatures from about 427 C to about 204 C or about 800 F to about 400 F more than doubles brake pad life expectancy. Because of this, the reduction of braking temperatures can generate substantial increases in the service life of brake pads leading to a robust and long lasting service life. In addition using cushions in this embodiment can result in savings on brake pad replacement costs as well as on replacement of other brake system components, most notably, rotors and calipers.

Another embodiment employing the cushions can reduce tire wear and other tire problems. An important effect of reducing severe frictional drag at rotor high spots and reducing excessive heat is the smoothing of the transfer of braking torque through the tires to the roadway. This effect lessens uneven tire strain during braking. As a result of this, tire cupping and other uneven tread wear can be reduced as well as internal tire problems such as cord separation. Over the lifetime of any vehicle, the resulting increased tire life can be significant.

This invention has been explained with respect to the details, arrangements of components and certain specific embodiments discussed. These embodiments can be modified by those skilled in the art without departing from the spirit and scope of this invention. The appended claims are intended to be interpreted to cover apparatus and methods that do not depart from the spirit and scope of this invention.

The invention claimed is:

1. A cushion for reducing uneven frictional drag between a disc brake pad and a disc brake rotor caused by irregularities on a friction face of the disc brake rotor, the cushion comprising:
   a cushion shape, the cushion shape allowing the cushion to fit between a force producing element of the disc brake assembly and a brake pad backing plate;
   the cushion placed between the force producing element and the brake pad backing plate, the cushion positioned to prevent the force producing element from directly contacting the brake pad backing plate;
   the cushion having a thickness to accommodate lateral movement of the brake pad as the pad passes the irregularities of the friction face;
   the cushion comprising resilient elastomeric material with Compression Set of less than about 30% when tested at about 200 C for about 70 hours, resilient response at frequencies from about 1 Hz. to about 500 Hz to accommodate lateral movement as the disc brake pad passes the irregularities of the friction face, and Tan Delta of from about 0.01 to about 0.4 at frequencies from about 10 Hz. to about 30 Hz. and temperatures from about ambient temperature to about 204 C; and the cushion preventing generation of excessive heat caused by the uneven frictional drag arising from interaction between the irregularities and the brake pad.

2. The cushion of claim 1 where the cushion is positioned between the force producing element of a brake assembly and the brake pad backing plate such that the cushion distributes force uniformly over the friction face of the disk brake rotor, the cushion reducing uneven heating of the brake rotor.

3. The cushion of claim 1 where the cushion is placed adjacent the backing plate of the disc brake pad in resilient elastomeric communication with the force producing element of the brake system to absorb lateral movement of the disc brake pad as the disc brake pad passes over irregularities in the friction face of the brake rotor, the cushion reducing excessive heating of the brake rotor.

4. The cushion of claim 1 where the resilient material comprises an elastomeric material having a Compression Set of less than about 15% when tested at about 200 C for about 70 hours.

5. The cushion of claim 1 where the resilient material comprises an elastomeric material having a Tan Delta from about 0.02 to about 0.05 at frequencies from about 6 Hz to about 20 Hz in the temperature range from about 93 C to about 260 C.

6. The cushion of claim 1 where the resilient material comprising the brake pad cushion is shaped to match the shape of a brake piston end.

7. The cushion of claim 1 in which the resilient material is a material having a synchronous response that can follow the brake rotor irregularities as they pass by the brake pad at frequencies from about 1 Hz to about 500 Hz.

8. An apparatus for reducing uneven frictional drag between a disc brake pad and a brake rotor friction face of a brake assembly due to irregularities on the brake rotor friction face comprising:

a brake caliper;

a brake rotor having the brake rotor friction face;

a brake piston for exerting force to press against the brake rotor friction face;

a brake pad comprising a backing plate and a friction pad for receiving force from a force producing element of the brake assembly to press against the brake rotor friction face; and a cushion disposed adjacent the brake pad backing plate in resilient communication with the force producing element of the brake assembly, the cushion comprising:

a cushion shape, the cushion shape allowing the cushion to fit between the force producing element of the disc brake assembly and the brake pad backing plate;

the cushion placed between the force producing element and the brake pad backing plate, the cushion positioned to prevent the force producing element from directly contacting the brake pad backing plate;

the cushion having a thickness to accommodate lateral movement of the brake pad as the pad passes the irregularities of the friction face;

the cushion comprising a resilient elastomeric material with Compression Set of less than about 30% when tested at about 200 C for about 70 hours, resilient response at frequencies from about 1 Hz. to about 500 Hz to accommodate lateral movement as the disc brake pad passes the irregularities of the friction face, and Tan Delta of from about 0.01 to about 0.4 at frequencies from about 10 Hz. to about 30 Hz. and temperatures from about ambient temperature to about 204 C; and the cushion evening the distribution of force exerted by the brake pad against the brake rotor friction face to reduce excessive brake heating.

9. The apparatus of claim 8 wherein the force producing element of the brake assembly is the brake piston.

10. The apparatus of claim 8 wherein the force producing element of the brake is the brake caliper.

11. The apparatus of claim 8 wherein the resilient material comprising the cushion is a resilient material having Tan Delta from about 0.01 to about 0.04 at frequencies from about 10 Hz to about 30 Hz in the temperature range from about 93 C to about 204 C.

12. The apparatus of claim 8 where the resilient material comprising the cushion is a resilient material having a Tan Delta, determined from dynamic mechanical analysis, from about 0.02 to about 0.05 at frequencies from about 6 Hz. to about 20 Hz. in the temperature range from about 93 C to about 260 C.

13. The apparatus of claim 8 having the resilient material comprising the cushion shaped to match the shape of the brake piston resting on the brake pad.

14. The apparatus of claim 8 comprising the cushion disposed on the backing plate of the brake pad to provide cushioning between the brake pad and the force element providing pressure on the brake pad to cause the brake pad to press on the brake rotor friction face.

* * * * *